Patented June 27, 1950

2,512,898

UNITED STATES PATENT OFFICE 2,512,898

N'-BUTYRYLSULFANILAMIDES

Martin E. Hultquist, Bound Brook, N. J., and Elmore H. Northey, Stamford, Conn., assignors to American Cyanamid Company, New York, N. Y., a corporation of Maine No Drawing. Original application December 15, 1944, Serial No. 568,386. Divided and this application April 30, 1948, Serial No. 24,408

2 Claims. (Cl. 260—397.7)

This invention relates to N'-butyrylsulfanilamide. The compound of the present invention and its salts may be represented by the formula:

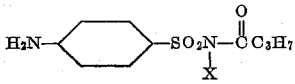

in which X is hydrogen or a salt-forming metal.

The compound of the present invention belongs to the group of N'-acylsulfanilamides of which N'-acetylsulfanilamide is known. The compound shows markedly greater activity against streptococcal infections. When compared with the acetyl compound in a typical test in which the drug was administered as a suspension in oil and controlled animals were used to assure the virulence of the bacteria, the controls, of course, dying, the N'-butyrylsulfanilamide showed an average survival of 80% of the mice inoculated with streptococci as against 47% for the acetyl compound. The activity against pneumococcal infections was only slightly less than the N'-acetylsulfanilamide.

The compound of the present invention may be prepared by two general procedures. One method is by reaction of butyryl chloride with the N'-sodium salt of $N^4$-acylsulfanilamide, such as $N^4$-acetylsulfanilamide, followed by hydrolysis of the $N^4$-acyl group. Another method is to react sulfanilamide with butyryl chloride to produce the $N^4$-acylamino N'-butyrylsulfanilamide, in such a case the acyl group being the same, namely the butyryl group, followed by hydrolysis. Inert solvents from liquid bases such as tertiary amines, for example pyridine, may be used.

The invention will be described in greater detail in conjunction with the following specific example. The parts are by weight.

EXAMPLE

N'-butyryl-$N^4$-acetylsulfanilamide

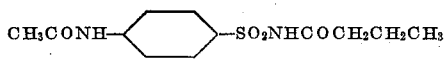

Anhydrous N'-sodium-$N^4$-acetylsulfanilamide was prepared as follows: crude $N^4$-acetylsulfanilamide paste as obtained in sulfanilamide manufacture was dissolved by the addition of solid, powdered sodium hydroxide to form a warm solution of the N'-sodium-$N^4$-acetylsulfanilamide. This was treated with decolorizing carbon, then cooled and crystallized, when it formed large crystals containing much water of crystallization which were filtered and washed with a little ice water. These crystals were melted in a small amount of water and recrystallized to free from excess caustic. As much of the adhering mother liquor was removed as possible by filtration and the crystals were then dried in a vacuum oven at not over 50° C. until practically anhydrous, then at 60°–70° C. until completely anhydrous, as indicated by hydrolysis of a sample to sulfanilamide and titration with nitrite. The resulting anhydrous material was finely ground and used for the following synthesis:

236 grams or 1 mole of the N'-sodium-$N^4$-acetylsulfanilamide were suspended in 400 cc. of anhydrous dioxane. 108 grams of butyryl chloride or 1 mol was added under agitation and when the reaction moderated, heat was applied to maintain a slow boiling for 3 hours under reflux condenser. The product was practically insoluble in the dioxane and was removed by filtration. It was recrystallized twice from 2 liters of 70% alcohol using decolorizing carbon. Melting point was 238.2°–240° C. Assay by sodium hydroxide was 98.4%. Crystals were needle shaped.

N'-Butylrylsulfanilamide

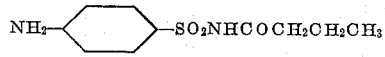

Hydrolysis of the acetyl group was accomplished by boiling one mol of the N'-butyryl-$N^4$-acetylsulfanilamide with 2.5 parts of sodium hydroxide, and 750 cc. parts of water for 1½ hours. The mixture was acidified to about pH 9 with hydrochloric acid, treated with decolorizers, cooled and a crop of sulfanilamide filtered off. The filtrate was then acidified to about pH 4 and the crude N'-butyrylsulfanilamide crystallized on cooling. The product was recrystallized from water using decolorizing carbon. It was soluble about 1½% near the boil. Assay by sodium hydroxide titration, 100.2%; assay by nitrite titration, 100.6%. Theoretical molecular weight was 242.3. Melting point was 116.1°–117.3° C. Crystals were in the form of long prisms.

In the examples, $N^4$-acetylsulfanilamide has been used in each case as the starting material because it is cheap and readily available. It should be understood, however, that the invention is not limited to the use of $N^4$-acetylsulfanilamide and any other acyl derivative such as formyl, propionyl, benzoyl, and the like, may be substituted for the acetyl derivative.

This application is a division of our copending application, Serial No. 568,386, filed December 15, 1944, now U. S. Patent 2,456,051, which in turn was copending with and a continuation-in-part of an earlier application of the same inventors, Serial No. 259,382, filed March 2, 1939, which was abandoned on March 27, 1945.

We claim:

1. N'-butyrylsulfanilamide having the formula:

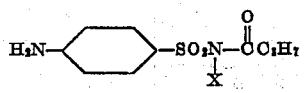

in which X is a cation.

2. N'-butyrylsulfanilamide having the formula:

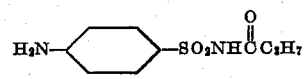

MARTIN E. HULTQUIST.
ELMORE H. NORTHEY.

REFERENCES CITED

The following references are of record in the file of this patent:

UNITED STATES PATENTS

| Number | Name | Date |
| --- | --- | --- |
| 2,411,495 | Dohrn | Nov. 19, 1946 |